United States Patent Office 3,424,528
Patented Jan. 28, 1969

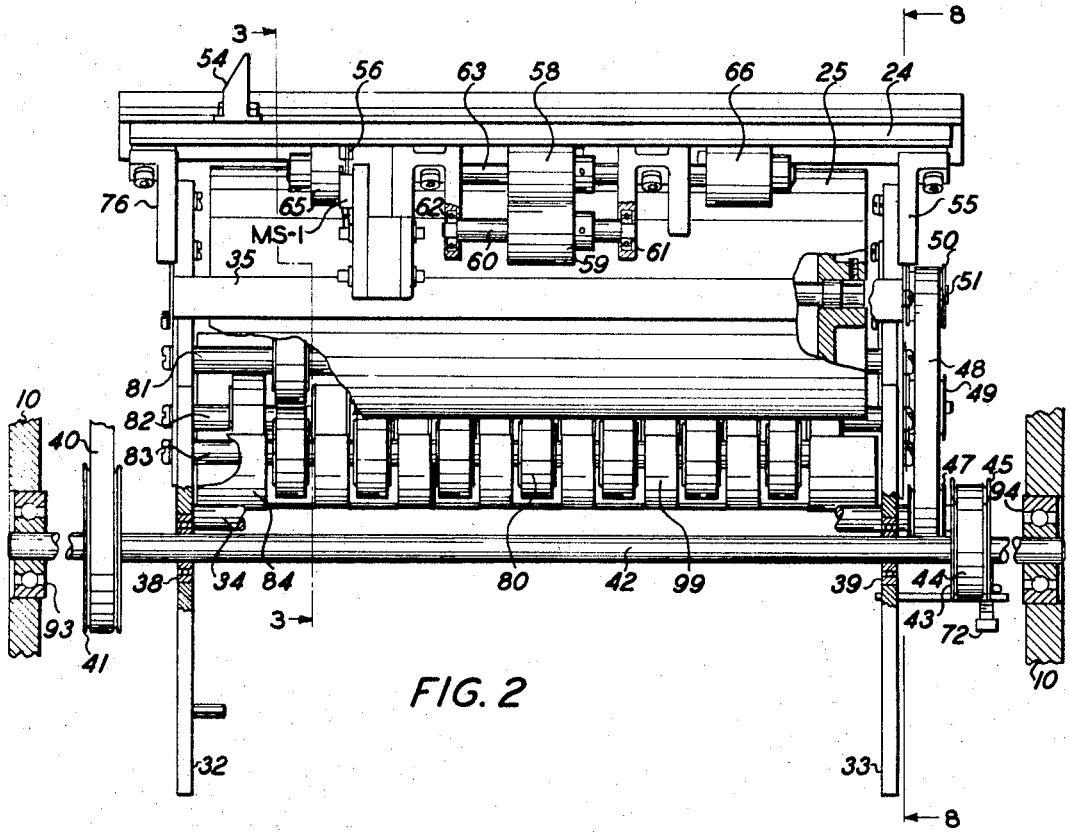
FIG. 2
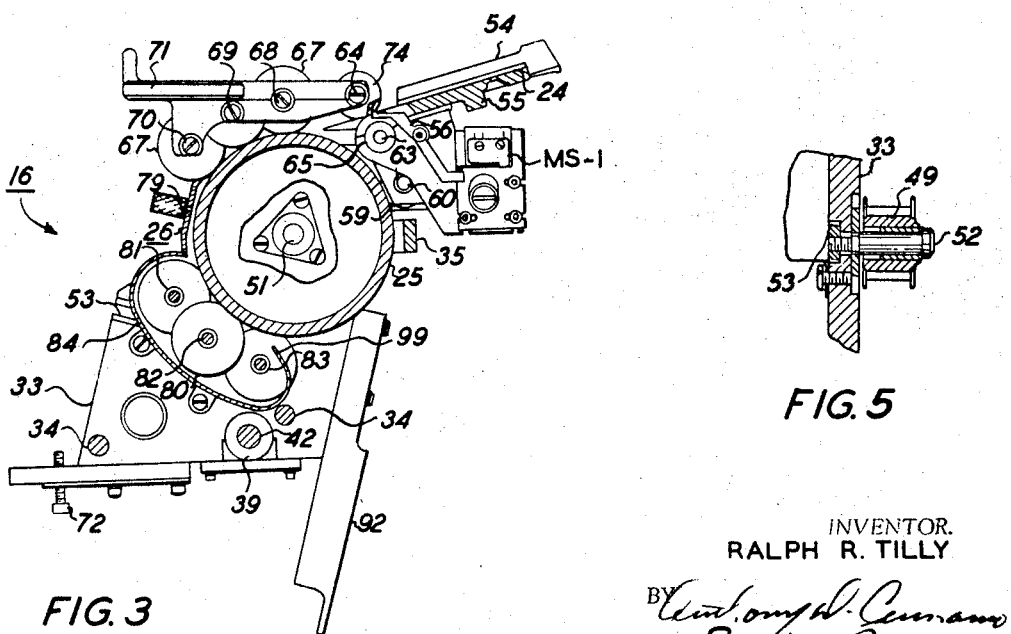
FIG. 3
FIG. 5

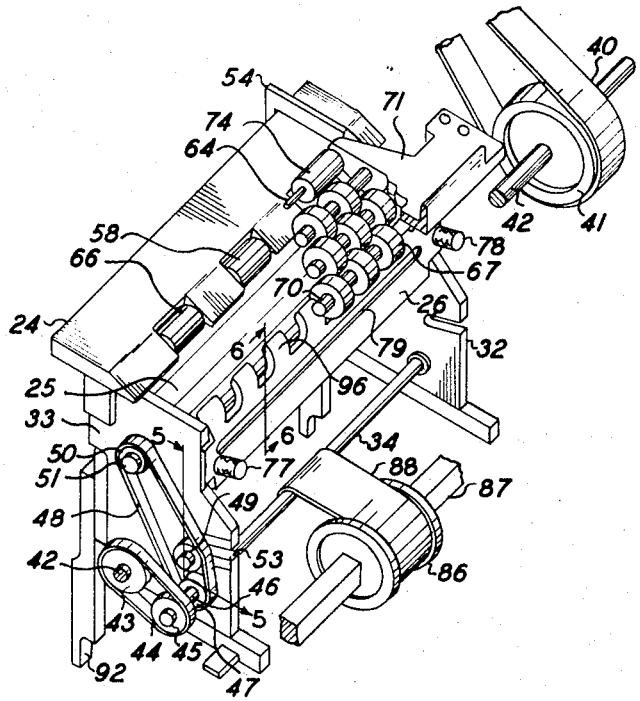
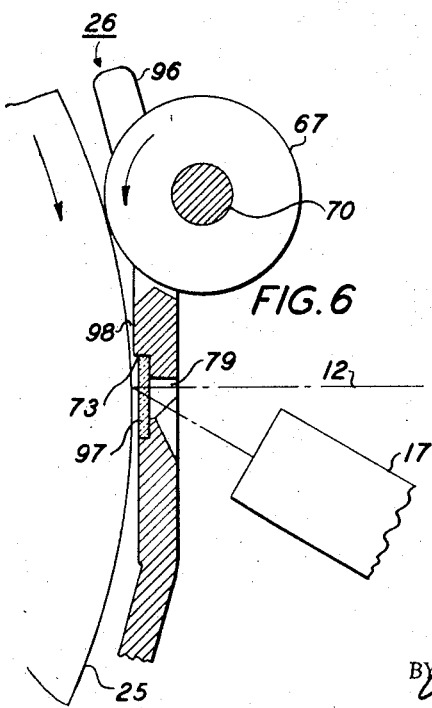

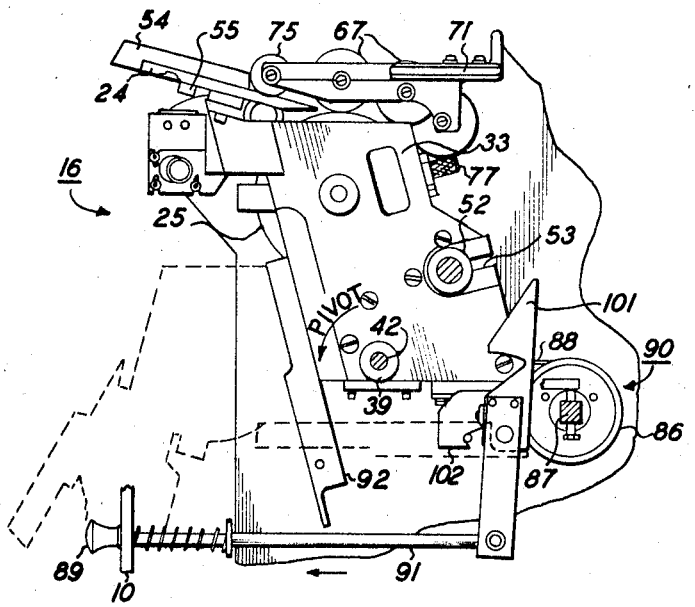

---

3,424,528
DOCUMENT CONVEYOR UNIT
Ralph R. Tilly, Webster, N.Y., assignor to Xerox Corporation, Rochester, N.Y., a corporation of New York
Continuation-in-part of application Ser. No. 335,158 Jan. 2, 1964. This application Mar. 4, 1966, Ser. No. 531,710
U.S. Cl. 355—49                      6 Claims
Int. Cl. G03b 27/70, 27/50

ABSTRACT OF THE DISCLOSURE

Document conveying apparatus for transporting documents to be scanned past a scanning station in which a rotatable cylindrical drum member is juxtapositioned to the scanning station to support the documents in scanning relation therewith. The documents are uniformly supported on the periphery of the cylindrical member by means of a plurality of soft deformable resilient guide roller members circumferentially positioned in rolling engagement with the cylindrical member in a staggered interlaced relation. The cylindrical drum member is pivotably mounted in relation to the scanning station to provide ready access thereto.

---

This application is a continuation-in-part of application, Ser. No. 335,158 filed Jan. 2, 1964, now U.S. Patent No. 3,239,220.

This invention relates to document conveying apparatus and, particularly to an apparatus unit used to convey documents past a scanning station at which the images thereon are optically sensed for reproduction.

Document conveyors of various types are well known in the art for advancing a document between different stations or positions within an apparatus. For whatever purpose the document is conveyed, it usually is required that conveyance be carried out without crumpling, tearing, dog-earing, jamming or otherwise adversely affecting the document in a way which renders it less presentable or useful for subsequent use. This requirement is particularly applicable in a reproduction apparatus wherein the consumer inserts an original document he wishes to retain and expects it to be returned, in its original condition after optical scanning without perceptible adverse effects of the type described.

Not only must the original document be saved harmless in this transport but for purposes of reproduction transport must be extremely uniform. This has not been easily achieved since on a random feed basis the document will likely vary widely in thickness dimension and shape. Notwithstanding, transport uniformity is essential in order, despite the document thickness, to remain in synchronization with the scanning operation with which the conveyor is associated in effecting reproduction of the document being scanned. That is whereas even infrequent jamming, crumpling, dog-earing, or tearing will discourage consumer use of the apparatus by virtue of an unwillingness to gamble the loss or destruction of an original document, non-uniformity in transport will likewise discourage such consumer use because of poor reproduction fidelity that will ultimately result. In accordance with the prior art it has been difficult to design and fabricate a document conveying unit that is compact in order to minimize occupied space in the apparatus of which it is a part while maintaining and effecting these operational characteristics as aforesaid.

It is therefore an object of the invention to provide a novel conveyor unit for document transport.

It is a further object of the invention to provide a novel document conveyor capable of transporting a document without crumpling, tearing, dog-earing, or otherwise deleteriously affecting the physical condition of a document being conveyed.

It is a still further object of the invention to provide a novel document conveyor capable of transporting the document as in the last recited object while effecting a highly accurate uniform transport thereof past a scanning station at which the images thereon are scanned for document reproduction.

It is a still further object of the invention to provide a novel document conveyor that is compact in construction as to require minimum space needs yet retains the capability of document transport of a variety of document thicknesses randomly supplied at uniform speed past a scanning station at which the images thereon are scanned for document reproduction.

These and other objects of the invention are obtained by means of a series of soft, highly resilient rollers or discs, preferably constructed of a material such as polyurethane foam axially mounted for rotation on a series of shafts. The rollers extend axially and circumferentially in rolling engagement with a rotating document drum juxtaposed to a document scanning station and are staggered in an interlaced relation along the periphery thereof. They have sufficient resiliency so as not to curl or otherwise divert the document in its transport path. At the same time any tendency to curl about the rollers is discouraged by the next forward roller tending to resist the document and retain it in its transport path for the continued conveyace thereof.

For a better uderstanding of the invention as well as other objects and further features thereof, reference is had to the following detailed description of the invention to be read in conjunction with the accompanying drawings wherein:

FIG. 2 is a front elevation of the document conveying apparatus hereof;

FIG. 3 is a sectional elevation taken substantially along the lines 3—3 of FIG. 2;

FIG. 4 is an isometric rear exterior view;

FIG. 5 is a sectional view taken substantially along the lines 5—5 of FIG. 4;

FIG. 6 is an enlarged sectional view taken substantially along the lines 6—6 of FIG. 4;

FIG. 7 is a top elevation of the top feed roll assembly, and

FIG. 8 is an elevation view taken substantially along the lines 8—8 of FIG. 2.

Figure 1:
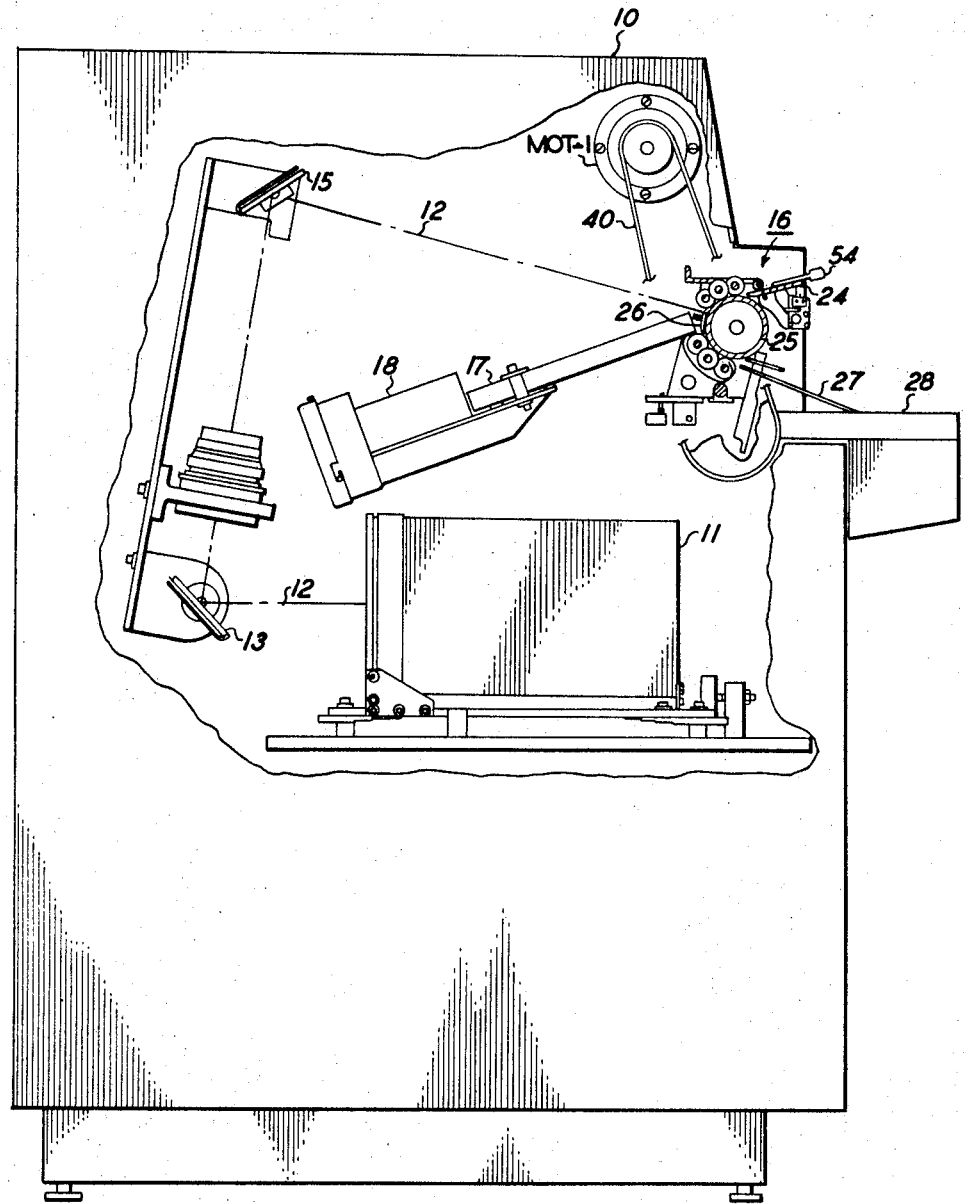
FIG. 1 is a side elevation of a facsimile apparatus in which the document conveyor of the invention is incorporated.

Although various uses of the device hereof are contemplated, for the purposes of description it will be disclosed in conjunction with a facsimile scanning apparatus of a type disclosed in copending application, Ser. No. 290,260, filed June 24, 1963, entitled, "Facsimile Scanning Apparatus," and incorporated herein by reference.

Referring now to FIG. 1 an overall facsimile apparatus embodiment is illustrated of a type in which the invention hereof can be incorporated and comprised of a cabinet housing 10 within which is mounted a cathode ray tube on a support 11 to emit a light spot along a path 12. The light spot moves back and forth in a straight line across the tube face to travel along the path 12 to a mirror 13 wherefrom it is reflected into a lens 14. The lens focuses the light spot to size desired for subsequent document scanning purposes onto a mirror 15 from which it is reflected onto the document conveying apparatus of the invention 16 as will be described below. Light striking the scan line on a document moving through the conveying mechanism hereof is then reflected from the document surface into a light pipe 17. This conveys the illumination to a photomultiplier 18 in which the light signals are transduced into electrical signals for transmission to a facsimile receiver and printer remotely located. The lens 14, the cathode ray tube housing 11 and the mirrors 13 and 15 are suitably mounted on support members attached to the cabinet frame 10. It is usual that these components be individually adjustable to permit proper focusing of the light spot emanating from the CRT and to permit adjustment enabling the use of different phosphor areas on the CRT face for maintaining spot brightness over prolonged operating periods.

As shown in FIG. 1 the document conveying unit 16 of the invention includes a feed shelf 24 from which a document to be scanned is placed for advancement about a rotating drum support 25 to pass beneath a platen or paper guide 26 at which it is scanned by the moving light spot emanating from the CRT 11. Conveyance of the document continues uniformly past the scanning position until being discharged onto a shelf 27. This deflects the document downward onto a receiving platform 28 whereat it remains until recovered by an operator. During the transport of the document past the platen 26, light from the scanning light spot is reflected from the document surface into the light pipe 17 to the photomultiplier 18 for transmission as aforesaid.

Referring now to FIGS. 2 and 4 the primary support for the conveying apparatus consists of side frames 32 and 33 secured in their spaced relation by means of spacer shaft 34 and a spacer bar 35 and mounted for pivotal movement within the cabinet of the facsimile apparatus as will be described.

Drive for the unit as can be seen in FIGS. 2, 4 and 5 originates from motor MOT-1 which is continuously energized after an operator depresses a start button (not shown). The motor, through timing belt 40, connects to pulley 41 secured on drive shaft 42 extending across and between the side frames through bearings 38 and 39. Secured also on the shaft on the opposite end thereof is drive pulley 43 from which extends a timing belt 44 connecting to a pulley 45. The latter pulley is on a common shaft 46 with a pulley 47 which drives timing belt 48. Belt 48 extends over an adjustable idler pulley 49 to drive pulley 50 secured on shaft 51 to which drum 25 is mounted for rotation. Idler pulley 49, as shown in FIG. 5, is mounted via a draw bolt and guide 52 in slot 53 for adjustable movement to a secured position at which tension on belt 48 can be maintained.

Document feeding is initiated as can be understood with reference to FIGS. 2, 3 and 7, by placing a document to be reproduced with one edge adjacent a slidably adjustable paper guide 54 on shelf 24 secured via brackets 55 and 76 to the side frames of the unit. As a document is manually advanced by an operator, it depresses a pivoted actuator 56 for actuating a microswitch MS-1 to initiate associated operations such as cutter and meter billing signals which are related to the transport thereof. Further advance of the document places it in the bite of a plurality of pinch roller pairs on shafts 63 and 64 from which it is advanced automatically thereafter in contact about the drum periphery.

Drive for the pinch rollers is received from a hard rubber roller 59 secured on a rotatable shaft 60 supported between bearing supports 61 and 62. The roller periphery is maintained in compressed rolling engagement against the rotating drum surface to effect a friction drive of the former. This roller in turn frictionally engages the lower pinch roller 58 commonly supported with lower pinch rollers 65 and 66 rotated on its shaft 63. Each of these pinch rollers mesh with soft foam or the like as will be described upper pinch rollers 57, 74 and 75 on common rotatable shaft 64.

As the leading edge of the document passes from between the pinch rollers onto the drum surface, it is sequentially engaged on its topside by a plurality of circumferentially disposed, axially mounted guide rollers or discs 67. The rollers as illustrated in FIGS. 3, 4 and 7, are rotatably supported separated by spacers 95 on tandemly arranged axially parallel shafts 68, 69 and 70 secured at their ends in a bracket 71 secured in turn in stationary relation within the cabinet 10 of the facsimile apparatus. By securing bracket 71 stationary relative to drum 25, which is pivotal integrally with the unit to be spring urged against rollers 67 as will be described, any document thickness as may be encountered can be readily compensated for without upsetting the transport continuity or without undue pressure being applied against the document.

Each of the rollers 67 are mounted in rolling contact against the drum surface as to collectively comprise a staggered, interlaced feed arrangement of highly soft resilient material which can comprise various well known materials such as polyurethane foam. This material is sufficiently soft to maintain a flexible document in continuous contact against the drum surface as it travels along its transport path without significant regard to the thickness of the particular document being transported. Because of extreme resiliency and the staggered interlacing the roller arrangement ensures that a document cannot curl or follow the members upward away from the drum periphery. Any tendency of a document to curl about a particular roller 67 is discouraged by a subsequent roller in the transport path tending to force the document back onto the drum surface effecting an uninterrupted transport along its intended path. Furthermore, the light weight construction of the rollers minimizes the mass of the entire conveyor unit as well as reducing the drive load required from the drive motor.

The lowermost of the rollers 67 on shaft 70 as illustrated in FIG. 4 are supported interspaced between the fingers 96 of platen 26 mounted on the side frames via knurled screws 77 and 78 and including a transverse scanning slit 79. The light path 12 can be seen in the enlarged view of the platen in FIG. 6 extending through slit 79 and glass 97 to illuminate an advancing document from which it is reflected into the light pipe 17 as is shown also in FIG. 1. It should be noted that the inside surface of platen 26 includes insteps such as at edge 73 in a direction away from the document path 98 formed relative to the drum periphery to prevent any snagging from inadvertent edge trapping of the document.

Referring again to FIGS. 2 and 3, the document thereafter continues its advance until passing beneath a plurality of soft resilient rollers 80, circumferentially arranged interlaced about the drum surface and similar to rollers 67 described above. The latter rollers are mounted on three axially parallel, tandem or juxtaposed shafts 81, 82 and 83 each supporting their respective rollers 80 in rolling slightly compressed contact against the drum surface. A guard 84 extending beneath the latter rollers and including fingers or lips 99 extending up between the rollers serves as a light shield to prevent stray room light from being reflected upward against the document and through the scanning slit. After passing through this last set of rollers the document descends onto shelf 27 whereat it can be retrieved by an operator from receiving platform 28 (FIG. 1).

In order to provide complete access to all parts of the document conveying unit and at the same time maintain the drum surface in a continuous driving relation with resilient rollers 67 the entire unit is pivotally supported about drive shaft 42. As will be understood with reference to FIGS. 2 and 8, shaft 42 supports the side frames 32 and 33 via bearings 38 and 39 respectively and is end-supported in bearings 93 and 94 secured in cabinet 10. A negater spring coil 86 (see also FIG. 4) secured to stationary bar 87 provides a spring steel lead 88 under windup tension that extends outward and is attached on its lead end to spacing shaft 34.

In its normal operating position the unit is maintained forwardmost in a clockwise position (as viewed in FIG. 8) to the greatest extent possible by means of the spring lead 88 and a spring urged latch unit 90. The latch consists of an upper lock 101 and a lower lock 102 and is operable for release by means of a spring biased button 89 attached to arm 91 and extending outward to the operator's position. By withdrawing the button, latch lock 101 is released and the unit can be manually pivoted counterclockwise to a position shown dashed whereat it is secured by latch lock 102. This last position is determined by an arrest of stop bar 92 during pivot by an obstruction (not shown) in cabinet 10. As a result of the pivot, latch lock 102 is rotated to a latched position while spring lead 88 continues to be drawn under tension from the coil 86. Latching in this latter position maintains the unit accessible, i.e. can again release the latch to permit manual return of the coil spring. By subsequent use of button 89, an operator can again release the latch to permit manual return to the unit to its operating or scanning position whereby the drum 25 engages the lower surfaces of the rollers 67. Screw 72 (FIGS. 2 and 3) provides contact with an interlock (not shown) such that when the unit is pivoted outward, room light reaching the photomultiplier will not effect unwanted operation.

By the above description there is disclosed a novel compact document conveying unit for conveying a document past a scaning station at which the images thereon are optically scanned for reproduction. This is achieved in a structural arrangement that includes a plurality of highly resilient, interlaced, and staggered roller members in a secured position relative to a continuously rotating and spring floating drum. By this means various document thicknesses can be randomly accommodated for transport with equivalent ease and without affecting transport uniformity or unduly pressuring the document being transported. These particular features assure uniform document movement to maintain a highly uniform constant transport rate thereof past the scanning station. Each of the polyurethane foam rollers are positioned circumferentially spaced about the rotating drum so that rollers on the adjacent shafts are always in contact with different portions of the document during its advance. Since the rollers extend interlaced into overlapping areas on the drum periphery they substantially eliminate unrolled spaces or gaps between rollers in the transport direction. A document is therefore continuously maintained in circumferential contact with the drum periphery whereby it cannot curl or otherwise stray from the transport path. This thereby overcomes prior difficulties associated with more conventional type document conveying units in which transport pressure between the drive plane and document may vary as the function of the document thickness. In the instance of heavier or thicker documents these prior art devices frequently encounter hesitation is movement occasioned by the document in passing the exposure station.

Since many changes could be made in the above construction and many apparent widely different embodiments of this invention could be made without departing from the scope thereof, it is intended that all matter contained in the drawings and specification shall be interpreted as illustrative and not in a limiting sense.

What is claimed is:

1. A document conveyor comprising in combination:
    (a) a drum mounted for rotation;
    (b) a first plurality of soft resilient guide rollers mounted divided between at least two different shafts axially parallel to the drum and arranged in circumferential rolling engagement with the drum in staggered, interlaced relation to each other;
    (c) a second plurality of soft resilient guide rollers mounted divided between at least two different shafts axially parallel to the drum and arranged in circumferential rolling engagement with the drum in staggered, interlaced relation to each other at a position angularly displaced from said first plurality of guide rollers;
    (d) a scanning platen supported between said first and second guide rollers closely spaced to the drum periphery to permit a document to pass therebetween and defining a transverse scanning slit through which to scan a document moving therepast; and
    (e) drive means operatively connected to said drum for effecting its rotation whereby a document to be conveyed passes thereon sequentially past said first guide rollers, said scanning platen and said second guide rollers.

2. A document conveyor according to claim 1 in which said scanning platen includes a plurality of fingers extending interspersed between the rollers of said first guide rollers juxtaposed thereto to encompass the adjacent portions thereof and provide an uninterrupted guiding of a document thereat to past said scanning slit.

3. A document conveyor according to claim 1 including:
    (a) stationary support means for securing the axial relation of said first plurality of guide rollers;
    (b) pivoted support means integrally supporting said drum, said platen and said second plurality of guide rollers; and
    (c) spring means urging said drum on its support against said first plurality of guide rollers.

4. A document conveyor according to claim 3 including:
    (a) a document feed shelf integrally secured to said pivoted support means and
    (b) a pair of document feed rollers adjacent said shelf and driven from said drum to feed a document from said shelf into the feed approach between said first guide rollers and said drum.

5. In a document scanning apparatus for optically sensing document images for reproduction and including a substantially light tight enclosure, and optical sensing means within said enclosure for receiving the image from a moving document, a document conveyor unit for uniformly advancing a document in scanning relation to said optical sensing means and comprising in combination:
    (a) a drum mounted for rotation;
    (b) a first plurality of soft resilient guide rollers mounted divided into at least two different rows extending axially parallel to the drum and arranged in circumferential rolling engagement with the drum in staggered, interlaced relation to each other;
    (c) a second plurality of soft resilient guide rollers mounted divided into at least two different rows extending axially parallel to the drum and arranged in circumferential rolling engagement with the drum in staggered, interlaced relation to each other at a position angularly displaced from said first plurality of guide rollers;
    (d) a scanning platen supported between said first and second guide rollers closely spaced to the drum periphery to permit a document to pass therebetween and defining a transverse scanning slit in optical alignment with said optical sensing means; and
    (e) drive means operatively connected to said drum for effecting its rotation whereby a document to be conveyed passes thereon sequentially past said first guide rollers, said scanning platen and said second guide rollers.

6. A document conveyor unit according to claim 5 including:
    (a) support means within said enclosure for securing the axial relation of said first plurality of guide rollers;
    (b) second support means mounted within said enclosure for pivotally supporting an integral coupling of elements including said drum, said platen and said second plurality of guide rollers;
(c) latch means to secure said integral coupling of elements into a first position in which said drum is in said rolling relation with said first guide rollers; and
(d) latch release means operative when actuated to permit said integral coupling of elements to be pivoted on said second support means from said first position to place said scanning platen exterior of said enclosure.

References Cited

UNITED STATES PATENTS

| 2,377,525 | 6/1945 | Schutt | 88—24 X |
| 2,537,529 | 1/1951 | Hessert et al. | 88—24 |
| 2,578,037 | 12/1951 | Berlant | 88—24 |

NORTON ANSHER, Primary Examiner.

RICHARD A. WINTERCORN, Assistant Examiner.

U.S. Cl. X.R.

271—75; 355—65, 133